US009315995B2

(12) United States Patent
Fournie et al.

(10) Patent No.: US 9,315,995 B2
(45) Date of Patent: Apr. 19, 2016

(54) METHOD AND DEVICE FOR STIFFENER PROTECTION, AND CORRESPONDING COMPOSITE PANEL

(71) Applicant: Airbus Operations SAS, Toulouse (FR)

(72) Inventors: Ludovic Fournie, Toulouse (FR); Philippe Blot, Nantes (FR); Cédric Belleil, Labarthe sur Leze (FR); Hervé Lesourne, Nantes (FR); Jean-Michel Laborie, Toulouse (FR)

(73) Assignee: Airbus Operations SAS (FR)

( * ) Notice: Subject to any disclaimer, the term of this patent is extended or adjusted under 35 U.S.C. 154(b) by 0 days.

(21) Appl. No.: 13/761,291

(22) Filed: Feb. 7, 2013

(65) Prior Publication Data

US 2013/0216771 A1 Aug. 22, 2013

(30) Foreign Application Priority Data

Feb. 17, 2012 (FR) ...................................... 12 51462

(51) Int. Cl.
  *E04C 2/38* (2006.01)
  *B32B 3/04* (2006.01)
  *B64C 3/20* (2006.01)
  *B64C 1/06* (2006.01)
  *B64C 1/00* (2006.01)

(52) U.S. Cl.
  CPC ...... *E04C 2/38* (2013.01); *B32B 3/04* (2013.01); *B64C 1/064* (2013.01); *B64C 3/20* (2013.01); *B64C 2001/0072* (2013.01); *Y02T 50/433* (2013.01); *Y10T 29/49826* (2015.01); *Y10T 428/24198* (2015.01)

(58) Field of Classification Search
  CPC .......... E04B 9/30; E04C 2/38; B60J 10/0014; B60J 10/0068; B32B 3/04
  USPC .............. 52/506.06, 506.08, 520, 521, 716.8, 52/741.3, 800.1, 800.11, 800.12, 800.17, 52/802.1, 543–545, 718.02, 718.03, 52/718.04–718.06; 296/39.1, 146.6, 296/146.7; 428/122
  See application file for complete search history.

(56) References Cited

U.S. PATENT DOCUMENTS 1,385,217 A * 7/1921 Lutz ................................. 52/464
3,392,498 A * 7/1968 Rogers ............................ 52/395
6,725,624 B2 * 4/2004 Hirath et al. ............... 52/800.11
(Continued)

FOREIGN PATENT DOCUMENTS

FR          2902689 A1    12/2007

*Primary Examiner* — William Gilbert
(74) *Attorney, Agent, or Firm* — Lerner, David, Littenberg, Krumholz & Mentlik, LLP

(57) ABSTRACT

The stiffeners of a composite material panel may be protected by a structural section having a configuration absorbing edge impacts without propagation of impact energy to the protected structure. Each composite panel with protected parallel stiffeners has a multiply front face coming to an edge and extending between two lateral flanks of outside plies, symmetrically relative to a median plane (Pm). A device for protecting each stiffener includes a structural section that caps the stiffener symmetrically relative to this median plane (Pm). This structural section consists of an upper section formed above the edge and configured to envelop a space above the edge, a lower section framing the lateral flanks by longitudinal walls (Pi) fastened to these flanks, and an intermediate section bearing at least partially on the edge via transverse walls (Pb) so as to minimize the propagation of impact forces to the lower section.

10 Claims, 4 Drawing Sheets

(56) References Cited

U.S. PATENT DOCUMENTS

| | | | |
|---|---|---|---|
| 7,562,509 B2* | 7/2009 | Ness | 52/800.11 |
| 7,703,256 B2* | 4/2010 | Haddock | 52/543 |
| 7,814,729 B2* | 10/2010 | Normand et al. | 52/800.1 |
| 2008/0308669 A1 | 12/2008 | Lloyd | |
| 2009/0049771 A1* | 2/2009 | Konstantin | 52/200 |
| 2010/0132293 A1* | 6/2010 | Voegele et al. | 52/402 |

* cited by examiner

METHOD AND DEVICE FOR STIFFENER PROTECTION, AND CORRESPONDING COMPOSITE PANEL

TECHNICAL FIELD

The invention relates to a method for protecting composite panel stiffeners and to a device adapted to implement that method. It also concerns a composite material panel including stiffeners protected by said device against impacts on their edges.

The field of the invention is the protection of the edges of composite material structures composed of superposed plies of epoxy resin reinforced by fibers with different orientations, in particular panels self-stiffened by extensions forming stiffeners.

BACKGROUND OF THE INVENTION

Aeronautical structures utilize this type of panel in a wing or ventral beam box section, for example. These panels, highly loaded in compression, are generally sized for stability in terms of compression if holed and damage tolerance.

Damage tolerance is a particular penalty for this type of panel with low damage tolerance in the event of impacts on their edge. Indeed, their superposed carbon fiber ply structure open on the edge is greatly weakened by an impact on that edge. The shock of the impact in fact induces "decohesion" (i.e. separation) of the plies through the exercise of out-of-plane forces.

The precise field of the invention is therefore protecting the edges of self-stiffened panels.

In order to alleviate this fragility and this lack of damage tolerance, the panels are protected by rigidly fastened edge-cover structures. One edge-cover of this type is known from the patent document FR 2 902 689 or FR 2 869 871, for example.

Such edge-covers have a limited efficacy because they have a U-shaped overall structure that does not allow good absorption of impact energy. This energy is in fact transmitted to the structure or to the panel, the shape having no really damping character. This transmission may result in damage to the panel and its connections to other parts.

Moreover, these edge-covers, entirely stuck to the stiffener, are not demountable. To remove them, the assembly must be destroyed, which leads to the destruction of the protection itself. The structure to be protected is therefore not easy to inspect after an impact.

BRIEF SUMMARY OF THE INVENTION

An aspect of the invention aims to reduce the influence of the damage tolerance criterion by protecting the stiffener by means of a structural section that has a configuration absorbing edge impacts without propagation of the impact energy to the protected structure.

An aspect of the invention consists in a method of protecting composite panel stiffeners. This method comprises coupling a structural section to each stiffener to be protected, the stiffeners each including an edge and lateral flanks. The structural section has a so-called upper section extending at a distance from the edge and configured in the form of an envelope adapted to absorb impacts on the edge by plastic deformation, a so-called lower section framing the lateral flanks and an intermediate section bearing at least partially on the edge so as to minimize the propagation of impact forces to the lower section. The method thereafter consists in coupling the lower section framing the lateral flanks to be demountable by detachment of fixing elements without deformation of the structural section.

In particular embodiments:
 the upper, intermediate and lower sections are interconnected to form a continuous structural section of substantially constant thickness;
 the upper section has a small overall size laterally, preferably less than or equal to the distance between the lateral flanks.

Another aspect of the present invention also consists in a device for protecting stiffeners of composite panels with parallel stiffeners each including a multiply front face coming to an edge and extending between two lateral flanks of outer plies, symmetrically relative to a median plane. The protection device includes a structural section symmetrical with respect to this median plane that caps the stiffener. This structural section consists of a so-called upper section formed above the edge and configured to envelop a space above the edge, a so-called lower section framing the lateral flanks with longitudinal walls rigidly fastened to these flanks, and an intermediate section bearing at least partially on the edge via transverse walls, so as to minimize the propagation of impact forces to the lower section.

According to preferred features:
 the upper section has in section a configuration chosen from a rectangle, an oblong shape, a double-lobe shape, and a T-shape with single or double stem;
 the double-lobe geometrical configuration produces, symmetrically relative to the median plane, a transition with the supports of the intermediate section;
 the framing lower walls of the lower section of each structural section are rigidly fastened to the lateral flanks of each stiffener by clamping means, in particular:
  a circular plate including an interface for sticking it to said flanks; the fixing interface is formed by stud/nut pairs, each stud coming from the plate and passing through the lower section by means of notches produced at regular intervals in the border of this wall;
  a clip that clips onto the flank of the structural section, notably by way of a trough formed by a shoulder and a projection;
  elastic clamping on the flanks of the stiffener, the material and conformation of the structural section advantageously enabling retention by spring loading of the lateral walls of the structural section;
 the framing lower walls of the lower section of each structural section feature lateral projections, notably trough-shaped extending longitudinally and serving to support and attach elements glued to the flanks of each stiffener to fasten together said lower walls;
 the framing lower walls of the lower section of a structural section feature at least one notch that is filled with a mastic;
 the material of the structural section is chosen from alloys based on aluminum, alloys based on titanium or an epoxy aramide composite.

BRIEF DESCRIPTION OF THE FIGURES

Other data, features of and advantages of the present invention will become apparent on reading the following description of one embodiment given with reference to the appended figures, in which.

DETAILED DESCRIPTION

In the following detailed description, the qualifiers "upper" and "lower" respectively relate to the space situated above the edge of each stiffener and to the spaces situated at the level of the lateral flanks of each stiffener. Furthermore, the term "lateral" qualifies any extension in a plane parallel to the plies of the stiffeners and the term "transversal" qualifies any extension in a plane perpendicular to those plies. Moreover, the term "external" is in opposition to the term "internal" by virtue of its greater distance from the median plane Pm. Moreover, identical reference signs in the figures refer to the same elements defined with reference to the passages that describe them.

The detailed description relates more specifically to composite panel stiffener protection embodiments including a multitude of stiffeners. Such a panel is formed in a manner known in itself from U-section preforms produced by stacking carbon-fiber-reinforced epoxy resin plies in order to form the stiffeners.

Figure 1A:
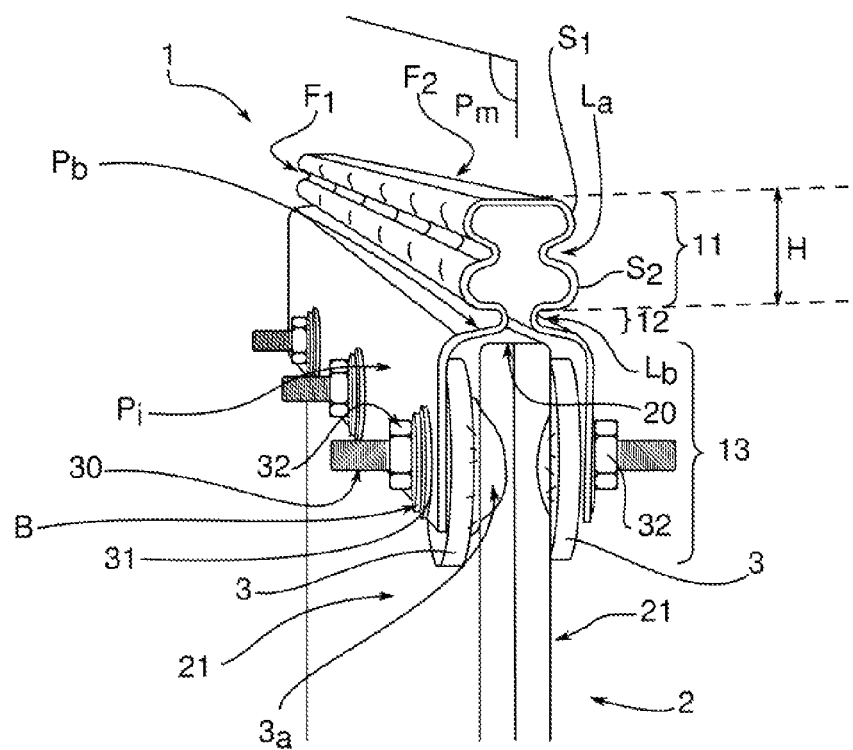
FIGS. 1a and 1b are partial perspective views of one example of a titanium-based alloy structural section with a double-lobe upper section, respectively a rectangular upper section, mounted on the flanks of each stiffener by gluing plates.

Referring to FIG. 1a, the perspective view shows a first example of a structural section 1 in titanium-based alloy, shaped in a hydraulic press. The upper section 11 of this structural section features two upper lateral walls F1 with "reentrant" double lobes La and Lb, formed symmetrically with respect to the median plane Pm of the stiffener 2, and a substantially plane upper wall F2 parallel to the edge 20 of this stiffener 2. The summits S1 and S2 of the reentrant lobes come as close as possible to the median plane Pm.

The lobes Lb have transverse walls Pb that come to bear on the edge 20 to form the intermediate section 12 of the structural section 1. These walls Pb are extended by framing lower walls Pi extending along the respective lateral flanks 21 of the outside plies of the stiffener 2. The lower walls Pi form the lower section 13 of the structural section 1. These walls Pi are rigidly fastened to the flanks 21 by circular plates 3 introduced between the lower walls Pi and the flanks 21. To be more precise, the plates 3 are equipped with studs 30 mounted centrally and perpendicularly to the plane of the plates 3. The studs 30 pass through the walls Pi via notches 31 formed in the extreme longitudinal border B of these walls. The internal faces 3a of the plates 3 are then stuck by means of epoxy resin to the flanks 21 and the studs 30 are fixed against the walls Pi by nuts 32 tightened onto the external face of the lateral flanks 21.

The notches 31 are produced at regular intervals along the borders B of the walls Pi, for example every 100 mm. The titanium alloy structural section has a thickness substantially equal to 0.5 mm and the upper section 11 has a height H substantially equal to 20 mm. Under these conditions, deformation of the upper section 11 created by an impact on the upper face F2 comes to bear on the edge 20 via the intermediate section 12, which makes it possible to limit the loading in shear of the lower walls Pi fixed against the flanks 21. The impact force is then distributed over the edge: the stress and the forces out of the stacking planes are thus limited and damage to the structure is prevented.

Moreover, the structural section 1 is easily demountable by loosening the nuts 32. Alternatively, "anchor" type spring fasteners may be used to produce a reversible fixing of the structural section to the flanks 21 of the stiffener 2.

Moreover, in the event of an impact on the upper wall F2, the enveloping shape of the upper section 11 makes it possible to dissipate the impact energy by plastic deformation. For example, the double-lobe shape in FIG. 1a enables absorption of 50 Joules produced by the impact of a hemispherical metal object without damaging the stiffener.

Figure 1B:
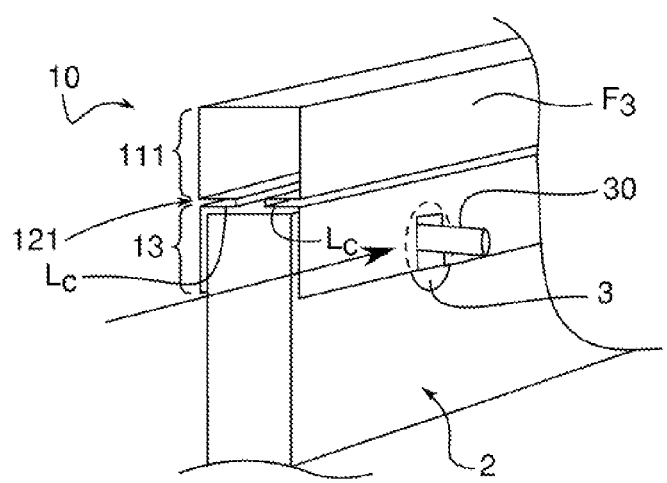

Alternatively, FIG. 1b shows a structural section 10 of a stiffener 2 that has an upper section 111 of rectangular cross-section, with no lobes. The upper lateral walls F3 of this section 111 are therefore plane but are extended transversely by reentrant bends Lc to form an intermediate section 121 bearing on the edge 20. The lower section 13 repeats that of the structural section from FIG. 1a.

Figure 2A:
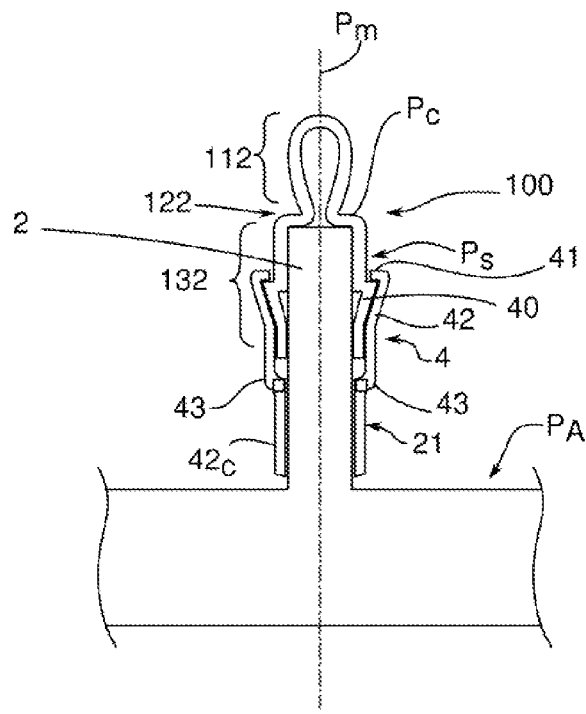
FIGS. 2a and 2b are partial perspective views in section of one example of an aramide-epoxy structural section mounted on a panel stiffener and featuring shoulders for attaching clips (also known as patches)
Figure 2B:
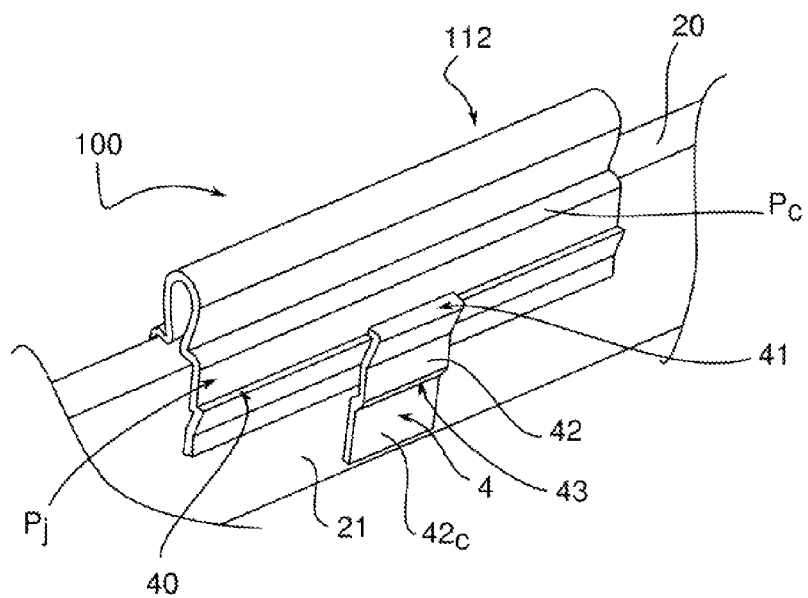

FIGS. 2a and 2b are perspective views in section of a second example of a structural section 100 in aramide and epoxy resin, with a thickness substantially equal to 1.6 mm. It is produced by molding in a metal mold and counter-mold with a metal core present.

The upper section 112 of the structural section 100 may have a circular or deformed circular type cross section. It advantageously has an elliptical type oblong cross section as shown, with a greater extent along the median plane Pm than transversely, so as to favor impact resistance. For the intermediate section 122, the structural section 100 is composed of lobe-shaped transverse bearing walls Pc of the same type as the walls Pb described above with a wider opening because of the oblong shape of the upper section 112.

To meet the requirements for reversible attachment to the flanks 21 of the stiffener 2, the framing lower lateral walls Pj of the lower section 132 include shoulders 40 adapted to serve as supports for clips 4. These clips 4 have rims 41 that bear on the shoulders 40 and longitudinal walls 42. These walls 42 terminate in forming, by virtue of a step 43, a face 42c in contact with the flanks 21 of the stiffener 2 of the panel $P_A$. These contact faces 42c are then stuck to the flanks 21, also by means of an epoxy resin. The shoulders 40 have a projecting profile in order to facilitate unfastening and therefore demounting of the structural section.

Figure 3A:
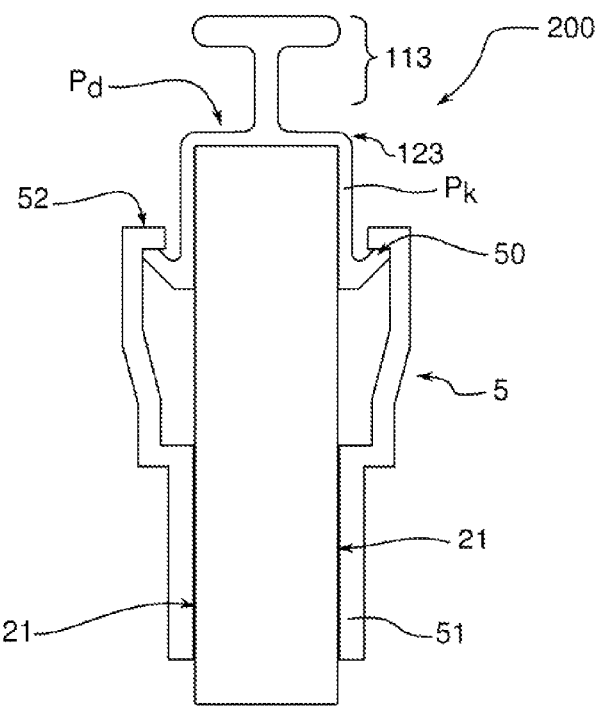
FIGS. 3a and 3b are partial perspective views in section of one example of a T-shaped aluminum-based alloy structural section mounted on a stiffener and featuring projections for attaching mounting clips on the flanks of the stiffener.
Figure 3B:
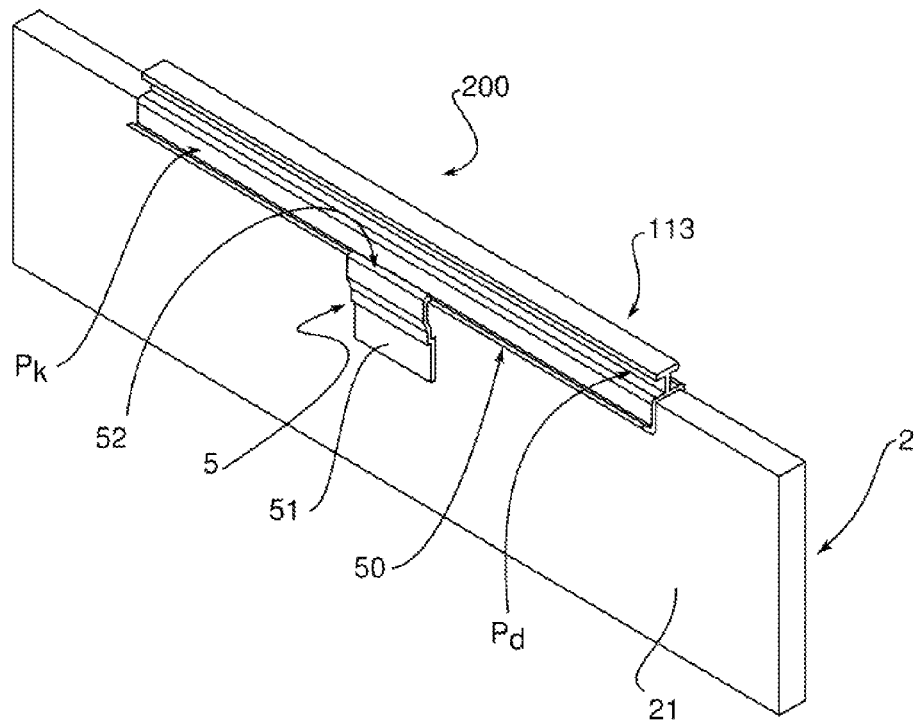

In another embodiment, shown in FIGS. 3a and 3b in section and in perspective, a structural section 200 is produced in extruded aluminum-based alloy. The structural section 200, with a thickness substantially equal to 1.5 mm, is T-shaped in the upper section 113. This shape is extended by a transverse wall Pd bearing on the whole of the edge 20 of the stiffener 2 to form an intermediate section 123. This transverse bearing wall Pd is extended perpendicularly by framing lower lateral walls Pk that come against the lateral flanks 21 of the stiffener 2.

These lower walls Pk each have a longitudinal projection 50 that serves as an attachment area for clips 5 disposed along the walls Pk. These patches have a wall 51 stuck to the flank 21 and a hook 52 that clips onto each projection 50. The patches are produced by injection molding plastic.

Figure 4A:
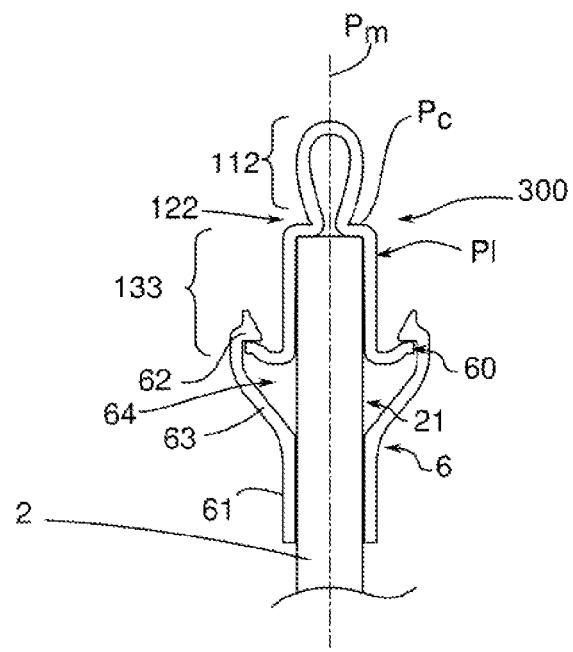
FIGS. 4a and 4b are partial perspective views in section of one example of an aramide-epoxy structural section mounted on a panel stiffener and featuring trough-shaped shoulders for attaching clips.
Figure 4B:
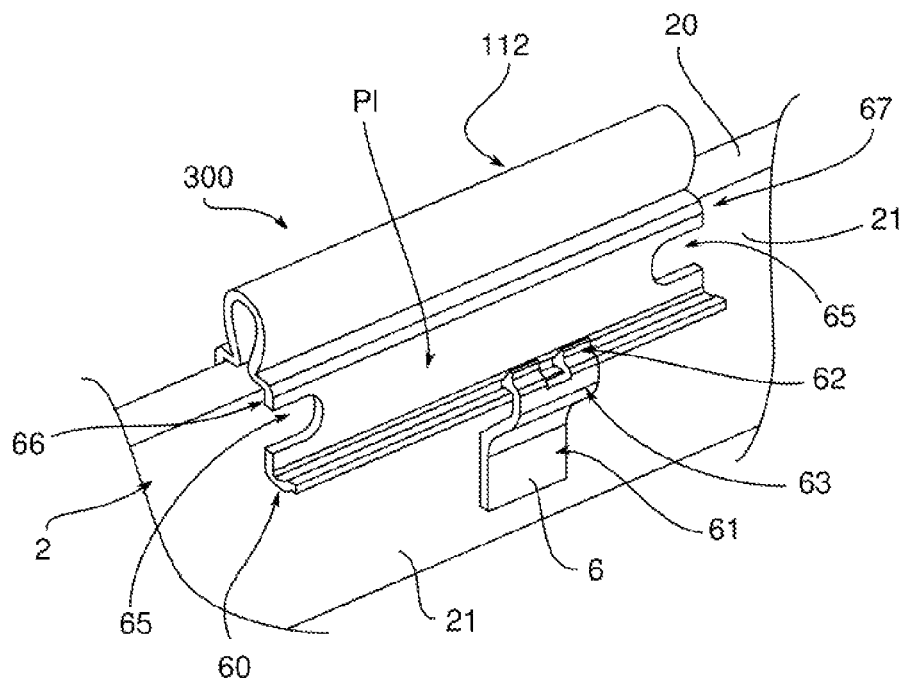

FIGS. 4a and 4b are perspective views in section of an example of an aramide and epoxy resin structural section 300 example representing a variant of the structural section 100 from FIGS. 2a and 2b, the upper section 112 and the intermediate section 122 of which correspond to those of FIG. 2a. In this example, for the requirements of reversible attachment to the flanks 21 of the stiffener 2, the lower lateral walls P1 of the lower section 133 of this structural section 300 include trough-shaped projections 60 that serve for fastening to clips 6 disposed along the walls P1. These clips 6 have a wall 61 stuck to the flank 21 and a hook 62 with a shape appropriate to the trough-shaped projection 60. These features make it possible to improve the durability and the strength of the assembly comprising the stiffener 2, the structural section 300 and the clip 6.

Moreover, the clips 6 comprise between the wall 61 and the hook 62 an intermediate part 63 that diverges from the corresponding flank 21 so as to form a space 64 between the clip 6 and the flank 21. This space 64 allows movement of the lower section 133 of the structural section 300 toward the lower part without acting on the clip 6, which enables detachment of the clip 6 to be avoided in the case of impact on the upper face of the structural section 300.

Moreover, notches 65 are produced on the lower lateral walls P1 of the structural section 300. These notches 65, which may notably be produced at the longitudinal ends 66, 67 of the lateral walls P1, are filled with mastic (not shown), which makes it possible to strengthen the adhesion of the structural section 300 to the flanks 21 of the stiffener 2.

The invention is not limited to the examples described and represented. For example, the material used for the structural section may consist of some other metal alloy (for example based on nickel) or some other composite material (based on glass, glass-aramide hybrid or carbon-aramide hybrid fibers). The fastening means on the lateral walls of the structural sections for the patches or clips may consist of a plurality of projections on each wall, and may be formed by molding them substantially in the middle of the wall or at its edge.

The invention claimed is:

1. A method for protecting a stiffener of composite panels, the stiffener including an edge and first and second lateral flanks, the method comprising:
    coupling a structural section to the stiffener, the coupling comprising:
        positioning an intermediate section of the structural section to at least partially bear on the edge;
        framing the first and second lateral flanks by a lower section of the structural section, the lower section extending from the intermediate section and having first and second longitudinal walls extending from the intermediate section; and
        fastening the first and second longitudinal walls to the first and second lateral flanks, respectively, via first and second clamping means, respectively,
    wherein the structural section further comprises an upper section extending from the intermediate section away from the edge and forming an envelope for absorbing an impact thereupon via plastic deformation and reducing propagation of the impact force to the stiffener.

2. The protection method as claimed in claim 1, wherein the upper section, intermediate section and lower section are interconnected to form a continuous structural section of substantially constant thickness.

3. The protection method as claimed in claim 1, wherein the upper section has an overall size laterally less than or equal to the distance between the lateral flanks.

4. A protection device for a stiffener of composite panels, the stiffener having an edge and first and second lateral flanks, the protection device comprising:
    a structural section having an upper section, an intermediate section, and a lower section,
    wherein the intermediate section has first and second transverse walls bearing at least partially on the edge,
    wherein the lower section has first and second longitudinal walls configured to frame, and be rigidly fastened to, the first and second lateral flanks, respectively, the first and second longitudinal walls extending from the first and second transverse walls, respectively, and
    wherein the upper section extends from the first and second transverse walls, is formed above the edge, envelopes a space above the edge, and
    a first clamping means configured to be fastened to the first lateral flank and a second clamping means configured to be fastened to the second lateral flank, the first and second clamping means configured to fasten the first and second longitudinal walls to the first and second lateral flanks, respectively.

5. The protection device as claimed in claim 4, wherein the upper section has a configuration chosen from a rectangle, an oblong shape, a lobed shape, a double-lobe shape, and a T-shape with single or double stem.

6. The protection device as claimed in claim 4, wherein the clamping means are chosen from a circular plate including an interface for sticking the circular plate to said first and second lateral flanks, a clip that clips onto the flank of the structural section, and elastic clamping on the flank.

7. The protection device as claimed in claim 6, wherein a fixing interface is formed by stud/nut pairs, each stud coming from the circular plate and passing through one of the first and second longitudinal walls by notches produced at regular intervals in a border of the corresponding longitudinal wall.

8. The protection device as claimed in claim 4, wherein the first and second longitudinal walls of the lower section of each structural section feature lateral projections extending longitudinally and serving to support and attach elements glued to the flanks of each stiffener to fasten together said longitudinal walls.

9. The protection device as claimed in claim 4, wherein the first and second longitudinal walls of the lower section of a structural section feature at least one notch filled with a mastic.

10. The protection device as claimed in claim 4, wherein a material of the structural section is chosen from alloys based on aluminum, alloys based on titanium or epoxy aramide.

* * * * *